United States Patent
Laughton

(10) Patent No.: US 11,720,511 B2
(45) Date of Patent: Aug. 8, 2023

(54) SELECTING, FROM A POOL OF ITEMS, A SELECTED ITEM TO BE ASSOCIATED WITH A GIVEN REQUEST

(71) Applicant: Arm Limited, Cambridge (GB)

(72) Inventor: Arthur Brian Laughton, Hathersage (GB)

(73) Assignee: Arm Limited, Cambridge (GB)

( * ) Notice: Subject to any disclaimer, the term of this patent is extended or adjusted under 35 U.S.C. 154(b) by 128 days.

(21) Appl. No.: 17/336,570

(22) Filed: Jun. 2, 2021

(65) Prior Publication Data

US 2022/0391342 A1 Dec. 8, 2022

(51) Int. Cl.
*G06F 13/40* (2006.01)
*G06F 16/22* (2019.01)

(52) U.S. Cl.
CPC ...... *G06F 13/4027* (2013.01); *G06F 16/2246* (2019.01)

(58) Field of Classification Search
CPC .......................... G06F 13/4027; G06F 16/2246
See application file for complete search history.

(56) References Cited

U.S. PATENT DOCUMENTS

| | | | |
|---|---|---|---|
| 2014/0115217 A1* | 4/2014 | Auerbach | G06F 13/14 710/240 |
| 2018/0198447 A1* | 7/2018 | Rice | H03K 19/003 |
| 2019/0042486 A1* | 2/2019 | Guthrie | G06F 12/0811 |
| 2019/0057092 A1* | 2/2019 | Craske | G06F 16/2246 |
| 2019/0057093 A1* | 2/2019 | Caulfield | G06F 16/24578 |
| 2020/0026674 A1 | 1/2020 | Tune | |
| 2020/0057737 A1* | 2/2020 | Chidambaram Nachiappan | G06F 13/368 |

OTHER PUBLICATIONS

Extended European Search Report for EP Application No. 22167969.9 dated Oct. 5, 2022, 7 pages.

\* cited by examiner

*Primary Examiner* — Nimesh G Patel
(74) *Attorney, Agent, or Firm* — Nixon & Vanderhye P.C.

(57) ABSTRACT

An apparatus comprises interface circuitry to receive requests and selection circuitry responsive to the interface circuitry receiving a given request to select, from a pool of items, at least one selected item to be associated with the given request. The selection circuitry comprises a plurality of nodes arranged in a tree structure, each node being configured to select m output signals from n input signals provided to that node, wherein n>m. The apparatus comprises control circuitry configured to output, in dependence on a type of the given request, a suppression signal, and the tree structure comprises a gate node configured to suppress, in response to the suppression signal having a first value, selection from input signals received from a given portion of the tree structure to prevent a subset of the pool of items from being selected for at least one type of request.

17 Claims, 14 Drawing Sheets

SELECTING, FROM A POOL OF ITEMS, A SELECTED ITEM TO BE ASSOCIATED WITH A GIVEN REQUEST

BACKGROUND

The present technique relates to the field of data processing.

In a data processing system, interface circuitry may be provided to receive requests, and selection circuitry may be provided to select items to be associated with the request.

SUMMARY

Viewed from one example, the present technique provides an apparatus comprising: interface circuitry to receive requests; and selection circuitry responsive to the interface circuitry receiving a given request to select, from a pool of items, at least one selected item to be associated with the given request;

wherein the selection circuitry comprises a plurality of nodes, each configured to select m output signals from n input signals provided to that node, wherein n>m;

wherein the plurality of nodes are arranged in a tree structure comprising a plurality of layers including at least a first layer of nodes and a final layer comprising a final node, the first layer of nodes being configured to receive input signals indicative of items in the pool of items, and the final node being configured to output a signal indicative of the at least one selected item, the output signals from a given layer of nodes other than the final node being supplied as the input signals for a subsequent layer; and wherein the apparatus comprises control circuitry configured to output, in dependence on a type of the given request, a suppression signal, and the tree structure comprises a gate node configured to suppress, in response to the suppression signal having a first value, selection from input signals received from a given portion of the tree structure to prevent a subset of the pool of items from being selected for at least one type of request.

Viewed from another example, the present technique provides a method comprising:

receiving requests; and in response to receiving a given request, selecting, from a pool of items, at least one selected item to be associated with the given request;

wherein the selected item is selected using selection circuitry comprising a plurality of nodes, each configured to select m output signals from n input signals provided to that node, wherein n>m;

wherein the plurality of nodes are arranged in a tree structure comprising a plurality of layers including at least a first layer of nodes and a final layer comprising a final node, the first layer of nodes being configured to receive input signals indicative of items in the pool of items, and the final node being configured to output a signal indicative of the at least one selected item, the output signals from a given layer of nodes other than the final node being supplied as the input signals for a subsequent layer; and wherein the method comprises outputting, in dependence on a type of the given request, a suppression signal, and suppressing, at a gate node and in response to the suppression signal having a first value, selection from input signals received from a given portion of the tree structure to prevent a subset of the pool of items from being selected for at least one type of request.

Viewed from another example, the present technique provides a non-transitory computer-readable medium to store computer-readable code for fabrication of an apparatus comprising:

interface circuitry to receive requests; and selection circuitry responsive to the interface circuitry receiving a given request to select, from a pool of items, at least one selected item to be associated with the given request;

wherein the selection circuitry comprises a plurality of nodes, each configured to select m output signals from n input signals provided to that node, wherein n>m;

wherein the plurality of nodes are arranged in a tree structure comprising a plurality of layers including at least a first layer of nodes and a final layer comprising a final node, the first layer of nodes being configured to receive input signals indicative of items in the pool of items, and the final node being configured to output a signal indicative of the at least one selected item, the output signals from a given layer of nodes other than the final node being supplied as the input signals for a subsequent layer; and wherein the apparatus comprises control circuitry configured to output, in dependence on a type of the given request, a suppression signal, and the tree structure comprises a gate node configured to suppress, in response to the suppression signal having a first value, selection from input signals received from a given portion of the tree structure to prevent a subset of the pool of items from being selected for at least one type of request.

Further aspects, features and advantages of the present technique will be apparent from the following description of examples, which is to be read in conjunction with the accompanying drawings.

DESCRIPTION OF EXAMPLES

Figure 1:
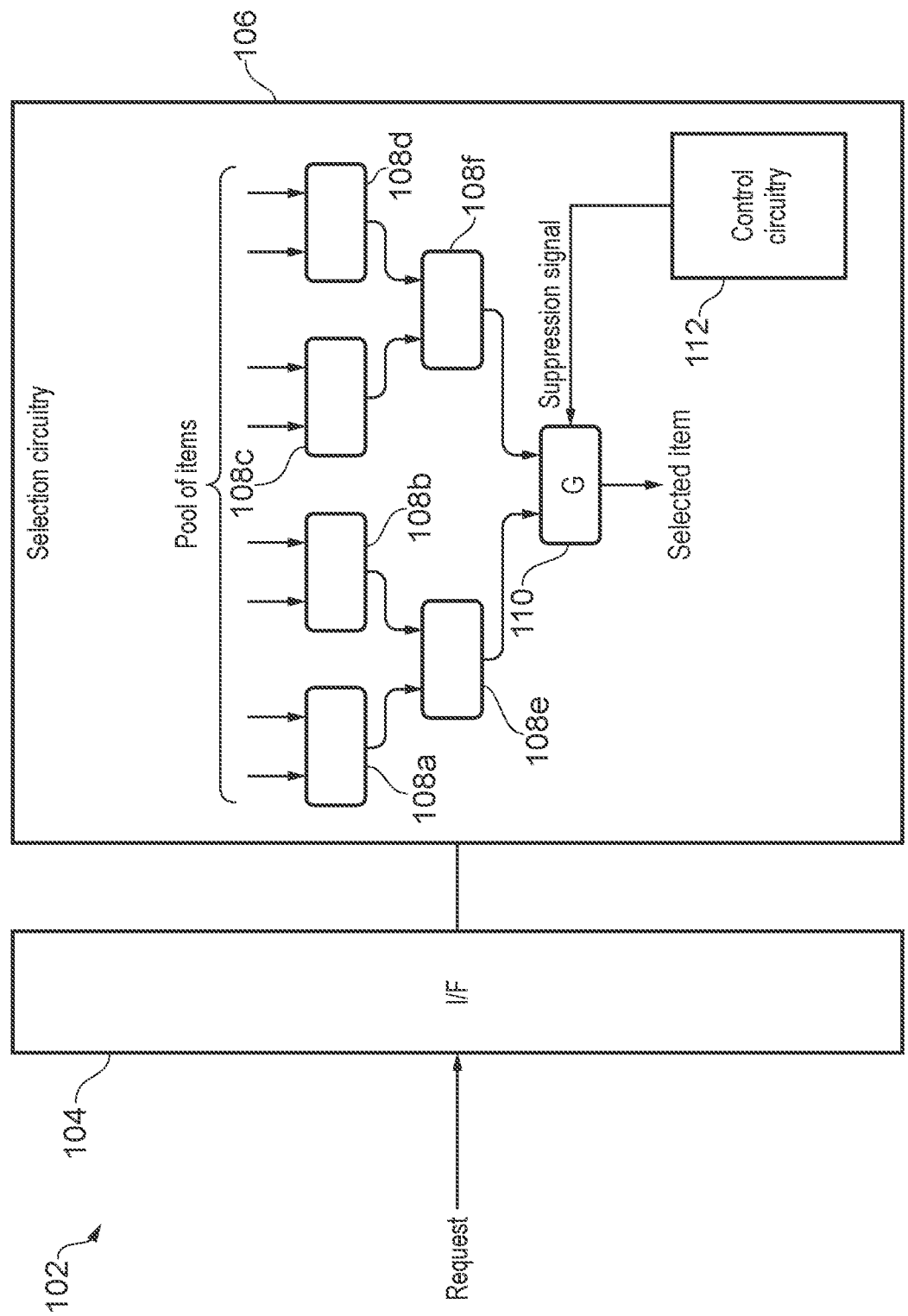
FIG. 1 schematically illustrates an example of a data processing system comprising interface circuitry and selection circuitry.

Before discussing the embodiments with reference to the accompanying figures, the following description of example embodiments and associated advantages is provided.

In accordance with one example configuration there is provided interface circuitry to receive requests, and selection circuitry responsive to the interface circuitry receiving a given request to select, from a pool of items, at least one selected item to be associated with the given request. The selection circuitry comprises a plurality of nodes, each configured to receive n input signals and select, from the input signals, m output signals, wherein n is greater than m. For example, a given node could be a 2:1 node (n=2 and m=1), a 4:1 node (n=4 and m=1), or a 4:2 node (n=4 and m=2), or could have any other ratio of m to n, provided than n>m. Moreover, all of the nodes in the tree structure may have the same values of n and m, or different nodes may have different values of n and m (e.g. some of the nodes have a first ratio of n:m, and other nodes have a second, different, ratio of n:m).

The plurality of nodes are arranged in a tree structure. In particular, the tree structure has multiple layers, including at least a first layer (e.g. a top layer or input layer) of nodes which receives input signals indicative of items in the pool of items. For example, each input signal received by the nodes in the first layer of nodes may represent a different one of the pool of items, so that the total number of input signals received by the nodes in the first layer may be equal to the number of items in the pool of items. The tree structure also comprises a final layer (e.g. a bottom layer or output layer) comprising a final node, the final node being configured to output at least one signal indicative of the at least one selected item. There may also be one or more intermediate layers between the first layer and the final layer, depending on the particular implementation. For example, the number of layers in the tree structure may be dependent on factors such as the number of items in the pool of items and the values of n and m for each node.

The output signals from a given layer of nodes other than the final node are supplied as the input signals for a subsequent layer. For example, each layer may comprise fewer nodes than the preceding layer, so that each layer in the tree of nodes filters out a fraction of the items in the pool, such that the number of input signals for each layer is less than the number of input signals for the preceding layer.

Providing a tree structure in this way can be a particularly efficient way of selecting an item from a pool of items, particularly when the pool of items is large, since a tree structure such as this can be easily scalable.

The inventors realised that it can be advantageous for a given instance of interface circuitry to be able to accept multiple different types of request, and that different types of request may have different requirements for the item selected by the selection circuitry to be associated with the request. For example, a given type of request may not be compatible with a subset of the pool of items. Therefore, it would be advantageous to be able to select an item from outside of that subset when the request is of that given type.

One way to do this could be to provide a separate tree structure for selecting items for each type of request, each tree structure selecting from a different (either overlapping or non-overlapping) pool of items specific to the corresponding type of request. In this way, by using the corresponding tree structure, the selected item could be selected from whichever pool of items is more appropriate to a particular type of request. However, this approach incurs a significant cost in terms or circuit area, since the logic from a single tree structure needs to be duplicated to allow for selection from each pool, even when there is an overlap between the pools of items available for particular types of requests.

The inventors realised that a more efficient approach, requiring significantly less circuit area, would be to provide a shared instance of the tree structure used for different types of requests, and to provide control circuitry to output, in dependence on a type of a given request received by the interface circuitry, a suppression signal. The tree structure comprises a gate node configured to suppress, in response to the suppression signal having a first value, selection from input signals received from a given portion of the tree structure, thus preventing a subset of the pool of items from being selected for at least one type of request. In this way, a simple modification to the selection circuitry (e.g. adding control circuitry and replacing one of the nodes in the tree with a gate node) allows the selection of an item to be tailored to the specific type of request received by the interface circuitry, without needing to provide a second instance of selection circuitry with a different tree structure. This allows the apparatus to support requests of multiple different types, without a significant increase in circuit area.

For one or more types of request that are able to be associated with any item from the pool of items (e.g. rather than being incompatible with a given subset of the pool of items), the present technique can allow the selected item to be any item from the pool of items, by—when the suppression signal does not have the first value—allowing the gate node to select from any of the input signals into the gate node. This can be advantageous because it does not unnecessarily restrict the pool of items for those types of request. However, in some examples, the gate node is responsive to the suppression signal having a second value to prioritise selection from input signals indicative of items in the subset of the pool of items over selection from input signals indicative of items outside of the subset of the pool of items. This prioritisation can take any form; for example, a simple prioritisation policy could be applied when the suppression signal has the second value, wherein the selected item is selected from outside of the subset of the pool of items unless there is no item available outside of the subset. Alternatively, a more subtle prioritisation policy may be applied which could, for example, be applied in combination with some other selection criteria such as a least-recently-used (LRU) policy or an additional priority policy.

Whatever the form of the prioritisation applied, this still allows the gate node to select an item from within the subset of items when the suppression signal has the second value, but items outside of the subset are prioritised over items from within the subset. This can be particularly advantageous, since it increases the likelihood of selecting an available item for the given request (by increasing the number of items from which the selection is made), but can also allow more of the items outside of the subset to be left available for those requests of the at least one type which require the selected item to be from outside the subset. Moreover, by providing a gate node which prioritises selection of items in the subset when the suppression has the second value, these advantages can be provided with a relatively small modification to the tree structure (e.g. a modification of the gate node can be sufficient without needing to change other nodes of the tree structure), and thus is easy to implement and does not significantly increase the circuit area of the selection circuitry.

In some examples, to prevent the subset of the pool of items from being selected for the at least one type of request, the given portion of the tree structure comprises nodes whose output signals are dependent on input signals indicative of items in the subset of the pool of items.

The position of the gate node in the tree may depend on any of a number of factors including, for example, the values of n and m for each node, the number of items in the pool of items as a whole, and the number of items in the subset of the pool of items.

In some examples, when each node in the tree structure has the same values of n and m, with m=1, wherein the pool of items comprises p items and the subset of the pool of items comprises s items, then the gate node may be positioned in a given layer which is y layers before the final layer, where when y=0 the given layer is the final layer itself and when y>0 the given layer is an earlier layer than the final layer. The gate node may be responsive to the suppression signal having the first value to prevent x of its input signals from being selected, wherein x<n. In such examples, the position of the gate node may thus be defined mathematically by the following equation:

$$\frac{x}{n^{y+1}} = \frac{s}{p} \qquad (1)$$

In some examples, the final node comprises the gate node. For example, the above equation may be satisfied by a value of y=0 (representing the final node) (e.g. when m=1 and x/n=s/p).

However, in other examples, the gate node is positioned in a layer other than the final layer. By allowing the gate node to be positioned in any layer of the tree structure (e.g. by allowing any of the nodes to be the gate node), the present technique can be applied in various different situations, with any proportion of s (the number of items in the subset) to p (the number of items in the pool of items). Hence, the position of the gate node in the tree can be selected to ensure a desired fraction of the total pool of items can be excluded from being selected for the at least one type of request.

As mentioned above, to support requests of multiple different types, each having different requirements with regard to an item to be associated with each request, a skilled person may consider providing two separate tree structures to select from respective pools of items (e.g. one for each type of request). This may allow an item to be selected from the pool which is most appropriate for the type of request. However, the inventors realised that different types of request can instead be supported without providing two separate tree structures. Instead, in examples of the present technique, the selection circuitry is configured to use the same tree structure for the at least one type of request and at least one other type of request. Thus, the selection of an item from the pool of items can be tailored to the type of a given request using the control circuitry and the gate node described above, without incurring the additional cost (e.g. in terms of circuit area) of duplicating the circuitry required to provide each tree structure.

In some examples, each node is configured to select the m output signals in dependence on an availability signal associated with each of the n input signals, each availability signal indicating whether an associated item in the pool of items is available for selection. For example, each node may be configured such that it selects, as the m output signals, input signals for which the corresponding availability signal indicates that the associated item is available, and prevents selection of input signals for which the corresponding availability signal indicates that the associated item is available. This may be independent of any other selection criteria applied—for example, each node may be configured such that any selection criteria used to select the output signals are applied for selecting among input signals representing available items.

In some examples, the gate node comprises an AND gate to receive the availability signal associated with one of the n input signals supplied to the gate node, and the AND gate is configured to combine the availability signal and the suppression signal to generate a selection signal to control whether said one of the n input signals is available for selection by the gate node. For example, the AND gate may comprise a Boolean logic gate which receives two input signals (e.g. the availability signal and the suppression signal) and outputs a signal (the selection signal) with value of either 1 or 0; for example, when both input signals have a value of 1, the output signal may have a value of 1, while in any other case, the output signal may have a value of 0. The gate node may then be configured to select the m output signals in dependence on the selection signal.

In this way, the present technique can be implemented with a relatively small alteration to the tree structure (e.g. adding a single AND gate to the gate node). Hence, this can be a particularly efficient way of implementing the present technique, that does not require a significant increase in the circuit area taken up by the tree structure.

In some examples, each node is configured to select the m output signals in dependence on at least one of a least-recently-used (LRU) policy, wherein the m output signals for each node are selected in dependence on which of the items represented by the n input signals were least recently assigned to a request, and a priority policy, wherein the m output signals for each node are selected in dependence on a priority associated with at least one of the n input signals.

Each of these policies may be advantageous; for example, the LRU policy may, over a given period of time, allow a greater number of the items in the pool of items to be used compared with other policies, which may help to reduce the likelihood of a given item being selected for multiple requests within a short space of time, which could lead to an error. On the other hand, the priority policy can be a simple way of allowing certain, preferred, options to be selected more frequently. It should be appreciated that any selection criteria—including a priority policy—may be applied in addition to any prioritization that may be applied by the gate node. For example, when suppression signal has the second value, if the gate node is configured to prioritise selection of items from within the subset, further selection criteria such as an LRU or priority policy may be applied to selection of an item from those items within the subset. Similarly, when the suppression signal has the first value and the gate node is configured to suppress selection from the subset of the pool of items, further selection criteria such as an LRU or priority policy may be applied to selection from outside of the subset. Moreover, it will be appreciated that these are just two examples of selection criteria that could be applied. Other selection criteria could be applied instead of (or in addition to) these policies. For example, a most-recently-used (MRU) policy could be applied, in which the m output signals for each node are selected in dependence on which of the items represented by the n input signals were most recently assigned to a request.

The items represented by the pool of items may depend on the particular implementation of the present technique, and the requirements of the particular system. However, in some examples, each item in the pool of items comprises an identifier, and the selected item comprises a selected identifier to be associated with the given request. For example, the present technique can be particularly beneficial in situations where different types of request are only permitted to be associated with certain values of the identifier.

In some examples, the interface is configured to receive the requests from at least one agent, and to transmit responses to the at least one agent in response to the requests. In such examples, the interface is responsive to receiving the given request to send an outgoing request and the selected identifier to a completer agent coupled to the interconnect, and to receive a given response and the selected identifier from the completer agent. Thus, the identifier may identify which responses received by the interconnect are associated with which requests.

In some examples, the subset of the pool of items comprises identifiers with a value greater than or equal to a threshold identifier value specifiable for requests of said at least one type. For example, some types of requests may be limited in terms of the size of identifier with which they can be associated. For example, the request itself may have a limited size, which may only allow a certain number of bits to be used for a identifier. On the other hand, other types of request may be able to support larger identifiers and so can specify identifier values greater than the threshold identifier value. The present technique can allow both types of request to be supported, by tailoring the selection of an identifier to the particular type of request.

In some examples, the interface is configured to send the outgoing request according to an outgoing request protocol, wherein the outgoing request protocol is selected in dependence on whether the given request is of a first type or a second type, and the at least one type of request comprises the first type. For example, the outgoing request protocol selected for the outgoing request may dictate factors such as the size of the outgoing response, or the type of response that is expected, and the selected outgoing request protocol may have certain requirements with regards to the identifier associated with the request. The present technique can, therefore, be particularly advantageous in such systems.

The outgoing request protocol may depend on the type of the given request in a number of different ways. In some examples, the outgoing request protocol comprises a first request protocol when the given transaction is of the first type, and a second request protocol different to the first request protocol when the given transaction is of the second type. However, in other examples, the interface is configured to send the outgoing request according to a first configuration of the outgoing request protocol when the given transaction is of the first type and to send the outgoing request according to a second configuration of the outgoing request protocol when the transaction is of the second type.

The requests can be of any type, depending on the specific implementation. However, in some examples, different types of request are intended for different completer agents. For example, the first type of request may comprise a request specifying a first completer agent, and the second type of request may comprise a request specifying a second completer agent different to the first completer agent. Also, in some examples, the interface is configured to receive address translation requests and access requests to access data stored in a storage device coupled to the interface, and the first type of request (e.g. wherein the outgoing request is sent according to the first request protocol, and selection from the subset of the pool of items is suppressed) comprises the address translation requests and the second type of request (e.g. wherein the outgoing request is sent according to the second request protocol) comprises the access requests.

It will be appreciated that identifiers are just one example of item which can be selected according to the present technique. Alternatively, in some examples, each item in the pool of items may comprise a hardware resource selectable for allocating to a request. In such examples, for the at least one type of request, the selection circuitry is restricted to selection of a hardware resource outside said subset of the pool of items, and for another type of request, the selection circuitry is capable of selecting any of the hardware resources in the pool of items.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may be define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular embodiments will now be described with reference to the figures.

FIG. 1 shows a system 102 comprising an interface (interface circuitry) 104 and selection circuitry 106. The interface 104 is configured to receive requests, and the selection circuitry 106 is configured to select, from a pool of items, a selected item to be associated with a given request received by the interface 104.

As shown in in FIG. 1, the selection circuitry 106 may comprise a plurality of nodes 108, 110 arranged in a tree structure. In particular, the tree comprises multiple layers of nodes, each layer comprising fewer nodes than the preceding layer. In this case, the tree comprises three layers of nodes: the first layer comprises four nodes 108a, 108b, 108c, 108d, the second layer comprises two nodes 108e, 108f, and the final layer comprises a single node 110, also known as the final node.

Each node receives a number of input signals—in this case 2—and outputs a number of output signals—in this case 1—selected from the input signals. Each input signal represents one of the items in the pool of items. In this particular example, there are 8 items in the pool of items, and each item is represented by one of the input signals into the first layer of nodes 108a, 108b, 108c, 108d. The input signals for each layer of nodes other than the first layer are provided by the output signals from the preceding layer of nodes. For example, the input signals to the nodes 108e, 108f in the second layer are the output signals from the nodes 108a, 108b, 108c, 108d in the first layer—in particular, the input signals for node 108e are the output signals from nodes 108a and 108b, and the input signals for node 108f are the output signals from nodes 108c and 108d. Similarly, the input signals for the final node 110 are the output signals from the nodes 108e, 108f in the second layer. In this way, half of the input signals are filtered out at each level, so that the final node 110 outputs a single output signal indicative of the selected item.

It will be appreciated that the arrangement shown in FIG. 1 is just one example, and in reality there may be any number of items in the pool of items, and the number and arrangement of nodes in the tree may be adjusted accordingly. Moreover, as will be discussed in more detail below, the nodes need not necessarily be 2:1 nodes (e.g. where each node receives two input signals and outputs a single output signal).

The interface 104 is capable of receiving multiple (e.g. at least two) different types of request, and each type of request may have different requirements for the selected item. In particular, at least one type of request may only be compatible with a subset of the pool of items. Thus, it can be beneficial for the selection performed by the selection circuitry 106 to take into account the type of the request.

To address this issue, the selection circuitry 106 also includes control circuitry 112 which, when the interface 104 receives a request of the at least one type, outputs a suppression signal having a first value. In addition, one of the nodes in the tree—in this case, the final node—is a gate node 110 (indicated with the letter "G"), which is responsive to the suppression signal having the first value to suppress selection of the selected item from one side of the tree, thus preventing selection of the selected item from a given subset (in this case half) of the tree.

Figure 2A:
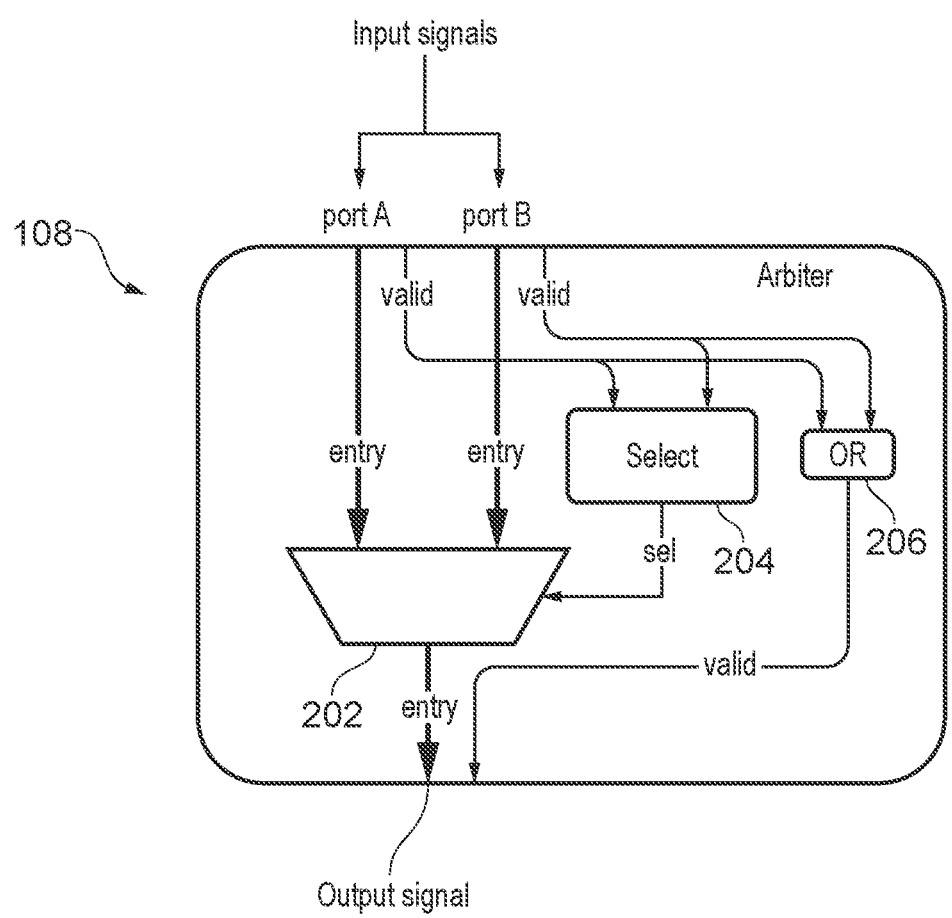
FIG. 2A schematically illustrates an example of a node in a tree of nodes provided within selection circuitry.
Figure 2B:
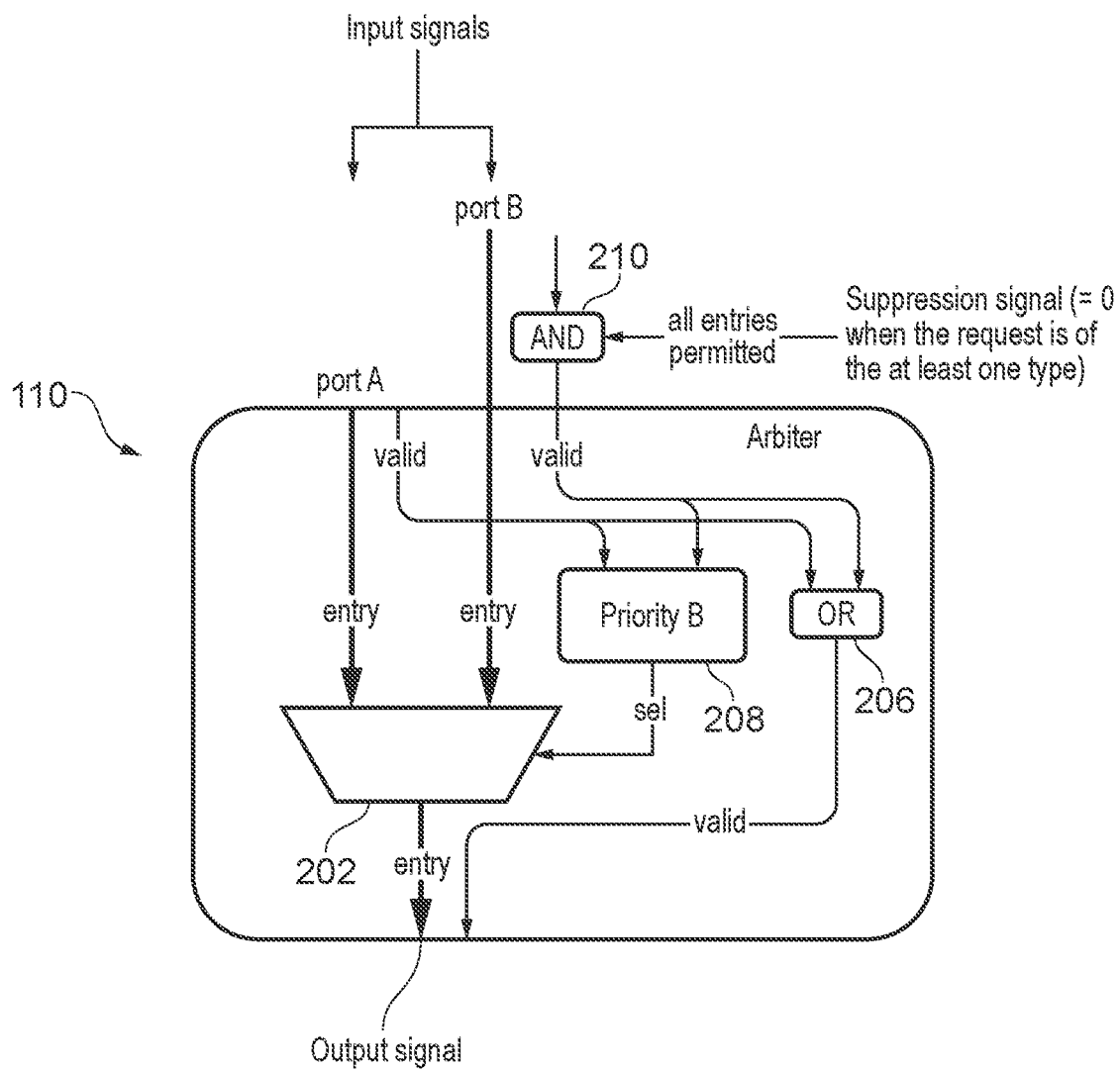
FIG. 2B schematically illustrates an example of a gate node.

FIGS. 2A and 2B show examples of the nodes 108, 110 in the tree structure. In particular, FIG. 2A shows an example of a normal node 108 (e.g. not a gate node), and FIG. 2B shows an example of a gate node 110.

The node 108 of FIG. 2A (which may also be referred to as an arbiter) is an example of a 2:1 node, meaning that it receives two input signals—at port A and port B—and outputs a single output signal. For each of the input signals, the node 108 also receives a valid signal. The valid signal (also referred to as an availability signal) corresponding to each input signal indicates whether the item represented by that input signal is available. For example, an item may be considered unavailable when it has previously been associated with another request which is still pending. In this example, the valid signal is equal to 1 when the corresponding item is available, and equal to 0 when the corresponding item is unavailable.

Each of the input signals is fed into a multiplexer 202, which selects one of the input signals under the control of a selection signal output by selection control circuitry 204. The selection control circuitry 204 receives, as inputs, the two valid signals, and outputs a selection signal in dependence on the valid signals and on selection criteria applied by the node 108. For example, if the valid signals indicate that one of the items represented by the input signals is available but the other is unavailable, the selection control circuitry 204 may output a selection signal which controls the multiplexer 202 to select the input signal representing the available item. On the other hand, if the valid signals indicate that both items are available, the selection control circuitry 204 may apply selection criteria such as an LRU policy (in which the input signal representing the item which was least recently assigned to a request is selected), a priority policy (in which the output signal is chosen based on some predetermined priority order; for example, a priority policy may dictate that the signal received at a given one of port A and port B should always be selected if it is indicated as available), an MRU policy (in which the signal representing the item which was most recently assigned to a request is selected), or a random policy (in which the output signal is selected at random).

The node 108 also includes an OR gate 206. An OR gate is a Boolean logic gate which receives two signals, and outputs one signal which has a value of 1 when at least one of the two received signals also has a value of 1. In this particular example, the OR gate 206 receives the two valid signals, and outputs a signal which becomes the valid signal for the output signal output by the node 108. In particular, when either one or both of the valid signals is asserted (e.g. has a value of 1, indicating that the item represented by a corresponding input signal is available), the OR gate outputs a signal of 1, indicating that the output signal selected by the node 108 is associated with an item in the pool of items which is available. If the node 108 is in a layer of the tree structure other than the final layer, both the valid signal generated by the OR gate 206 and the output signal selected by the multiplexer 202 are provided as inputs to a node 108, 110 in the next layer of the tree.

Like the normal node 108 shown in in FIG. 2A, the gate node 110 shown in FIG. 2B receives input signals at port A and port B. However, for the gate node 110, the input signal received at port A represents an item from outside the subset of the pool of items (e.g. an item which can be selected for the at least one type of request) and the input signal received at port B represents an item in the subset (e.g. an item which cannot be selected for the at least one type of request).

The gate node 110 has a similar arrangement to the node 108 shown in FIG. 2A, and comprises a multiplexer 202 to select an output signal from input signals received at two ports, port A and port B. The gate node 110 also includes an OR gate 206 to generate a valid signal to be output by the gate node 110. However, the arrangement of the gate node 110 differs from the arrangement of the normal node 108 in that the selection control circuitry 204 is replaced with priority control circuitry 208, and an AND gate 210 is additionally provided. In addition, the signal output by the AND gate 210 is supplied to both the priority control circuitry 208 and the OR gate 206 in place of the valid signal corresponding to the input signal received at port B.

An AND gate is a Boolean logic gate which receives two input signals, each equal to 1 or zero, and outputs a signal of 1 only when both of the input signals have a value of 1. In particular, the AND gate 210 of the gate node 110 receives the valid signal associated with the input signal received at port B, and the suppression signal generated by the control circuitry 112 (not shown). In this particular example, the suppression signal is asserted (e.g. has a value of 1) when the given request received by the interface is not of the at least one type (e.g. any of the pool of items may be selected for that request) and is de-asserted (e.g. has a value of 0) when the given request is of the at least one type (e.g. only an item outside of the subset of the pool of items may be selected). Hence, in this particular example, the AND gate 210 asserts a signal (e.g. outputs a signal equal to 1) only when both the entry represented by the signal received at port B is available, and the given request is not of the at least one type (e.g. when both the valid signal and the suppression signal received at the AND gate 210 are asserted, with a value of 1).

The priority control circuitry 208 receives the valid signal associated with the input at port A, and the signal output by the AND gate 210, and generates a selection signal which controls the selection of the output signal by the multiplexer. In particular, the priority circuitry 208 controls the multiplexer 202 to prioritise selection of the input signal received at port B, unless the given request received by the interface is of the at least one type. In particular, the priority control circuitry 208 controls the multiplexer 202 to make a selection according to Table 1 below.

TABLE 1

Selection of Output Signal at Gate Node

| Valid signal for port A (item outside subset) | Valid signal for port B (item in subset) | Suppression signal | Selection |
|---|---|---|---|
| 1 (available) | 1 (available) | 0 (subset not permitted) | Input A |
| 1 | 0 (not available) | 0 | Input A |
| 0 (not available) | 1 | 0 | Output valid signal = 0 |
| 0 | 0 | 0 | Output valid signal = 0 |
| 1 | 1 | 1 (any item permitted) | Input B |
| 1 | 0 | 1 | Input A |
| 0 | 1 | 1 | Input B |
| 0 | 0 | 1 | Output valid signal = 0 |

By prioritising the selection of the input signal received at port B for requests of a type other than the at least one type (when the suppression signal indicates that any item is permitted), the items in the subset of the pool of items are, if possible, reserved for use by those requests which are only permitted to use items from the subset. This can be a particularly advantageous approach, since it increases the likelihood that an available item can be selected for a given request, regardless of the type of the given request.

However, it will be appreciated that the gate node 208 need not, necessarily, include the priority control circuitry 208, and instead the priority control circuitry 208 could be replaced by selection control circuitry 204 of any form, as in FIG. 2A. Moreover, it will be appreciated that it is also possible that the selection control circuitry 204 shown in FIG. 2A could apply the same prioritisation policy (e.g. prioritising port B) as the priority control circuitry 208 shown in FIG. 2B.

Further, the prioritisation applied by the gate node 110 may take a different form to the example set out above. For example, the gate node 110 may apply a priority or LRU scheme (for example), and the prioritisation of port B over port A may more subtle, so that the gate node 110 may still be allowed to select port A instead of port B in the case when both port A and B are valid and the suppression signal indicates that any item is permitted. For example, if the priority/LRU scheme indicates that the input signal at port A is much more favoured than the input signal at port B, the gate node 110 may be allowed to select the signal at port A even when the signal at port B is available. The prioritisation of port B over port A may only be one factor in a multi-factor problem. For example, the prioritisation of port B over port A may only come into effect if the difference in ranking between port B and port A is small—if port A is ranked much higher than port B in terms of a LRU/priority policy, then port A may still be selected over port B.

Figure 3A:
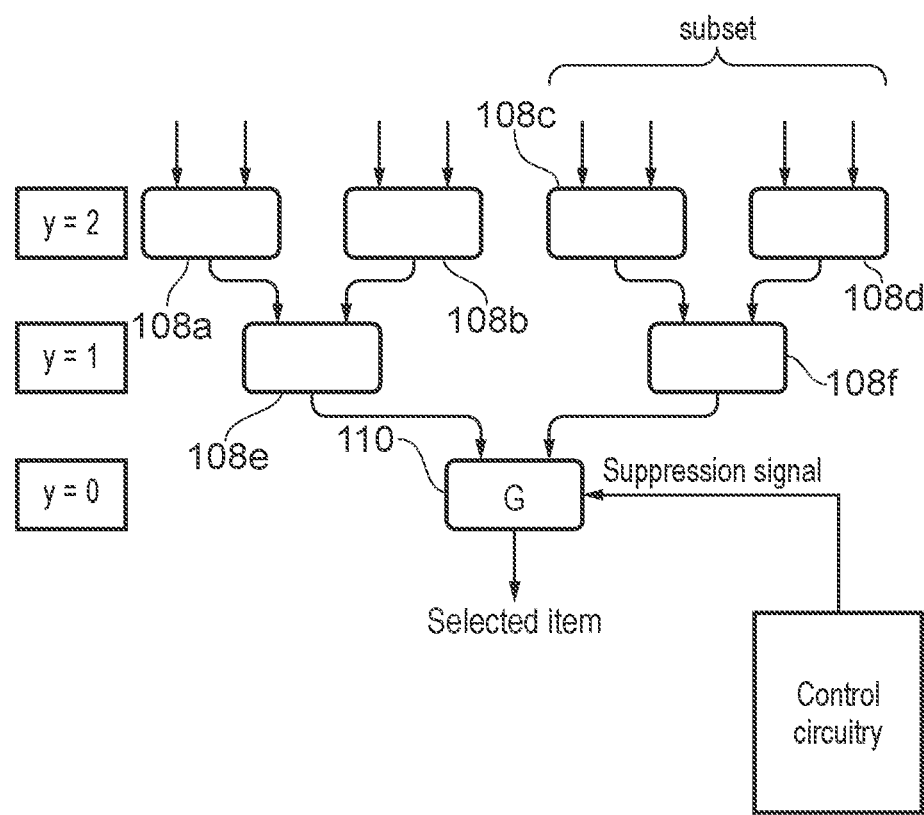
FIGS. 3A and 3B schematically illustrate examples of tree structures comprising gate nodes.
Figure 3B:
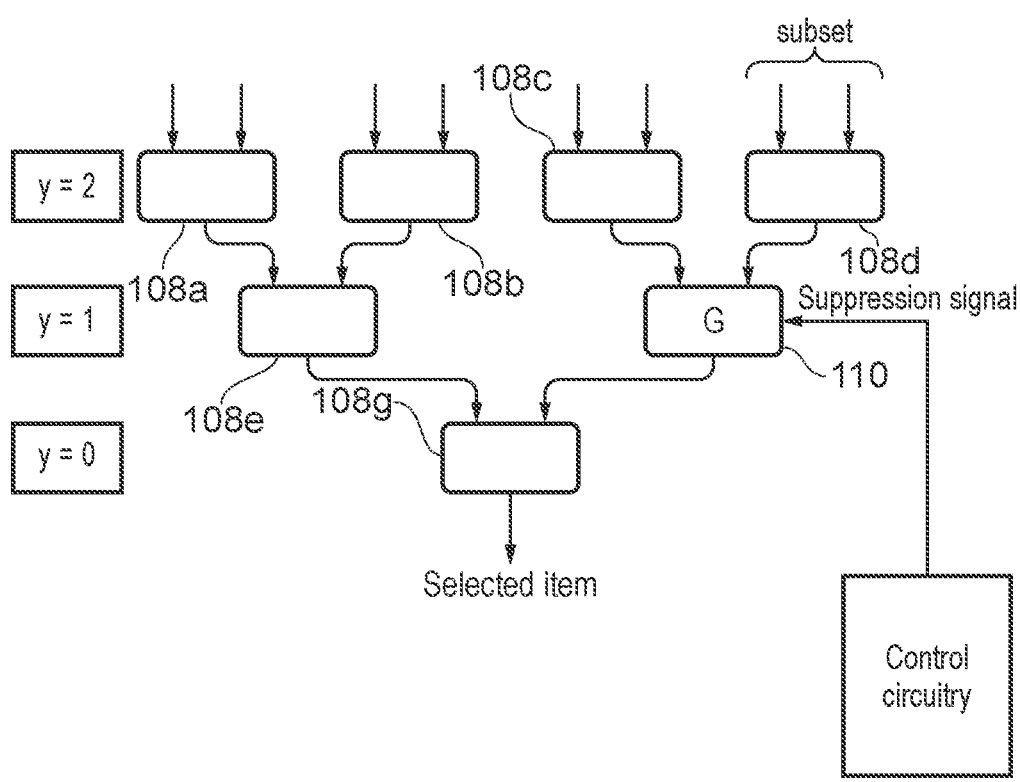

The gate node 110 can be positioned in any layer of the tree structure, depending on factors including the number n of input signals received by each of the nodes 108, 110, the number m of output signals output by each node 108, 110, the number of input signals from which selection is suppressed by the gate node 110 in response to the suppression signal having the first value, and the number of items in the pool of items and in the subset of the pool of items. FIGS. 3A and 3B show two examples of where the gate node 110 may be positioned within a tree comprising three layers of 2:1 (e.g. n=2 and m=1) nodes 108, 110.

In FIGS. 3A and 3B, the layers of the tree are labelled with y values, such that the final layer is labelled y=0, the next layer up (the second/middle layer) is labelled as y=1, and the first (input) layer is labelled as y=2. In FIG. 3A, the gate node 110 is located in the final layer (y=0) of the tree (e.g. the gate node 110 is the final node), allowing it to prevent selection from half (4 out of 8) of the items in the pool of items when the suppression signal has the first value (e.g. the subset in FIG. 3A comprises half of the pool of items). In other words, when the suppression signal has the first value, the gate node 110 in FIG. 3A gates off (prevents selection from) the portion of the tree which receives input signals indicative of the items in the subset of the pool of items—specifically, the gate node gates off the part of the tree comprising nodes 108c, 108d and 108f.

FIG. 3B shows another example of a tree of nodes. The tree in FIG. 3B has the same arrangement as the tree in FIG. 3A—each node is a 2:1 node, and the tree comprises 7 nodes arranged in three layers—except that the gate node 110 is positioned in the middle (y=1) layer. In this example, the final node 108g is therefore not the gate node 110. Hence, the subset of the pool of items comprises one quarter (2 out of 8) of the pool of items, and the portion of the tree that is gated off by the gate node 110 in response to the suppression signal having the first value comprises node 108*d* only.

As shown in FIGS. 3A and 3B, in a tree comprising 2:1 nodes, where the gate node 110 is configured to prevent selection of one of its two input signals when the suppression signal has the first value, the position of the gate node 110 is chosen in dependence on the number (p) of items in the pool of items and the number (s) of items in the subset of the pool of items. In particular, the position of the gate node 110 in a such a tree is defined by the following equation, where the gate node 110 is positioned in layer y, as discussed above:

$$\frac{1}{2^{y+1}} = \frac{s}{p} \quad (2)$$

For example, for the tree shown in FIG. 3A, s=4, p=8 and y=0.

Further, equation 2 can be generalised to any tree made up of n:m nodes, provided that n>m, and that the values of n and m are the same for every node in the tree. For example, if the gate node 110 is configured to suppress selection of x of the n input signals (wherein x<n), then the position of the gate node can be defined by:

$$\frac{x}{n^{y+1}} = \frac{s}{p} \quad (3)$$

As discussed above, the nodes in the tree structure can take any form, and need not necessarily be 2:1 nodes as illustrated in FIGS. 1 to 3. For example, FIGS. 4A and 4B illustrate two further example arrangements for the tree of nodes.

Figure 4A:
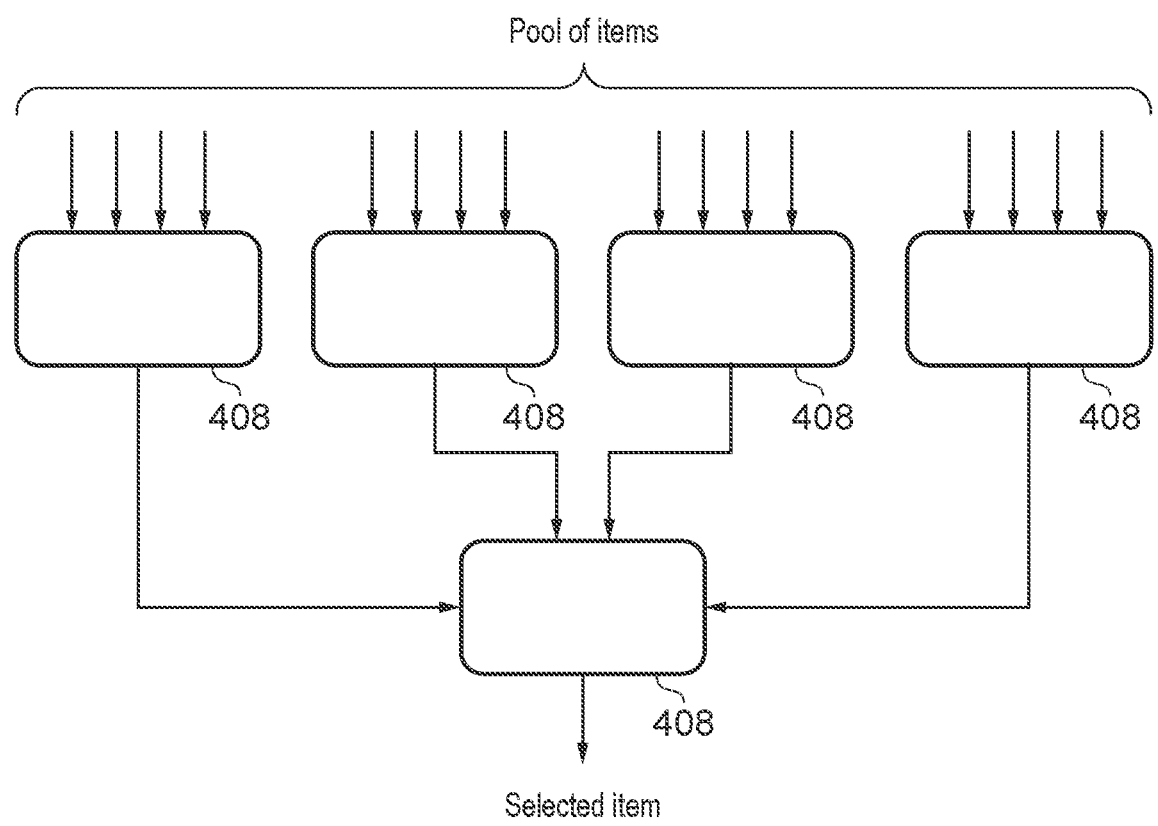
FIGS. 4A and 4B schematically illustrate further examples of tree structures.
Figure 4B:
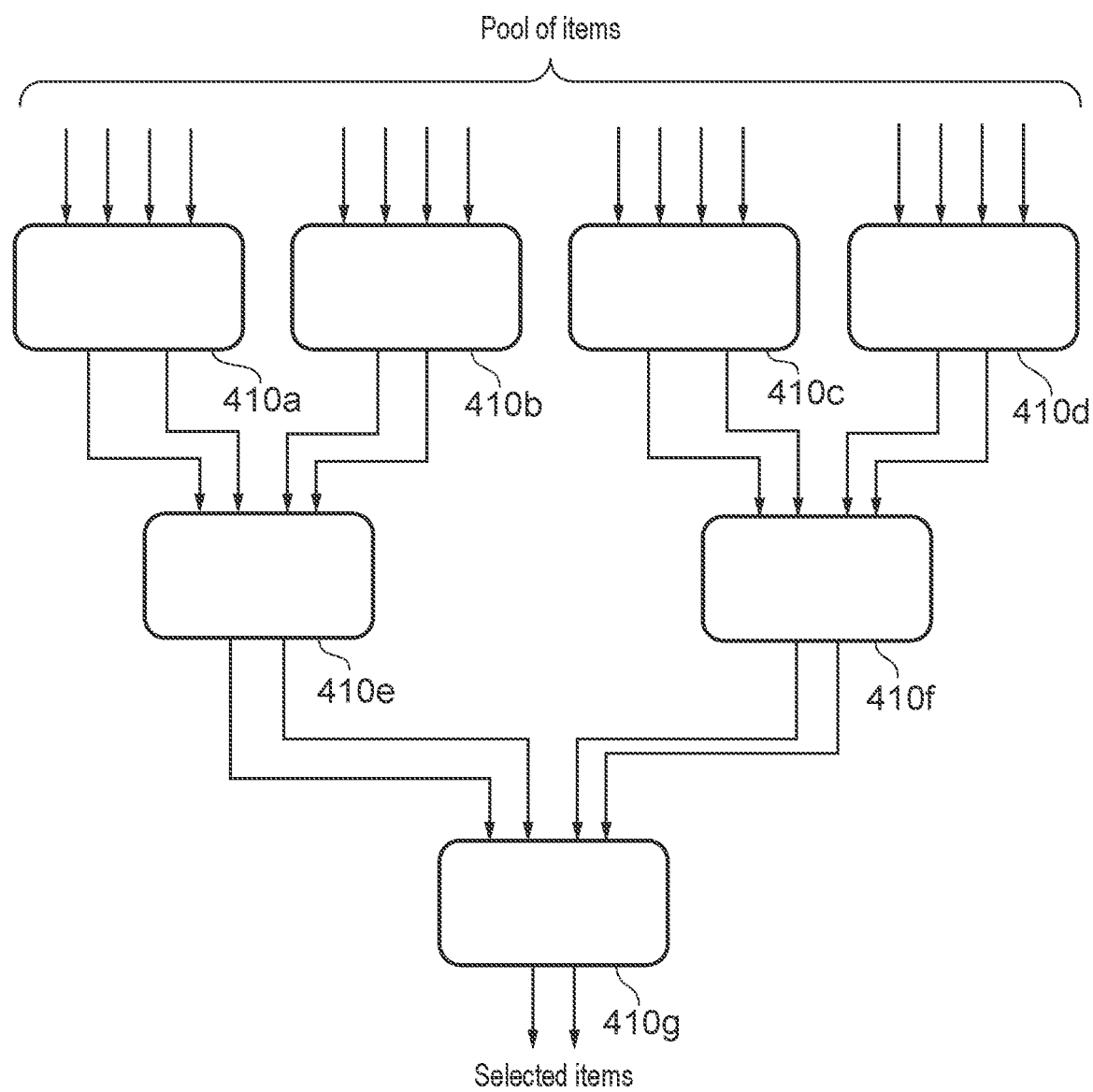

In FIG. 4A, each node 408 is a 4:1 node—e.g. the number of input signals (n) for each node is 4, and the number of output signals (m) for each node is 1. In FIG. 4B, each node 410 is a 4:2 node—e.g. n=4 and m=2. It will be appreciated that in each of the examples of FIG. 4A and FIG. 4B, one of the nodes 408, 410 is a gate node. Moreover, considering FIG. 4B in particular, it is noted that if it is necessary that only one item is selected (e.g. rather than two items being selected), a further 2:1 node could be included after node 410*g* to select between the two output signals from this node; alternatively, node 410*g* could be replaced by a 4:1 node.

While the Figures show examples which comprise only a single gate node, it may also be possible to include more than one gate node to prevent multiple subsets of the pool of items being selected. For example, in the tree of 2:1 nodes shown in FIG. 3B, an additional gate node is allocated at 108*e* to gate off port B (corresponding to the items whose input signals are supplied to node 108*b* in the first layer). This could be useful if there are three or more types of requests which may require selection from different partially overlapping pools of items.

Figure 5:
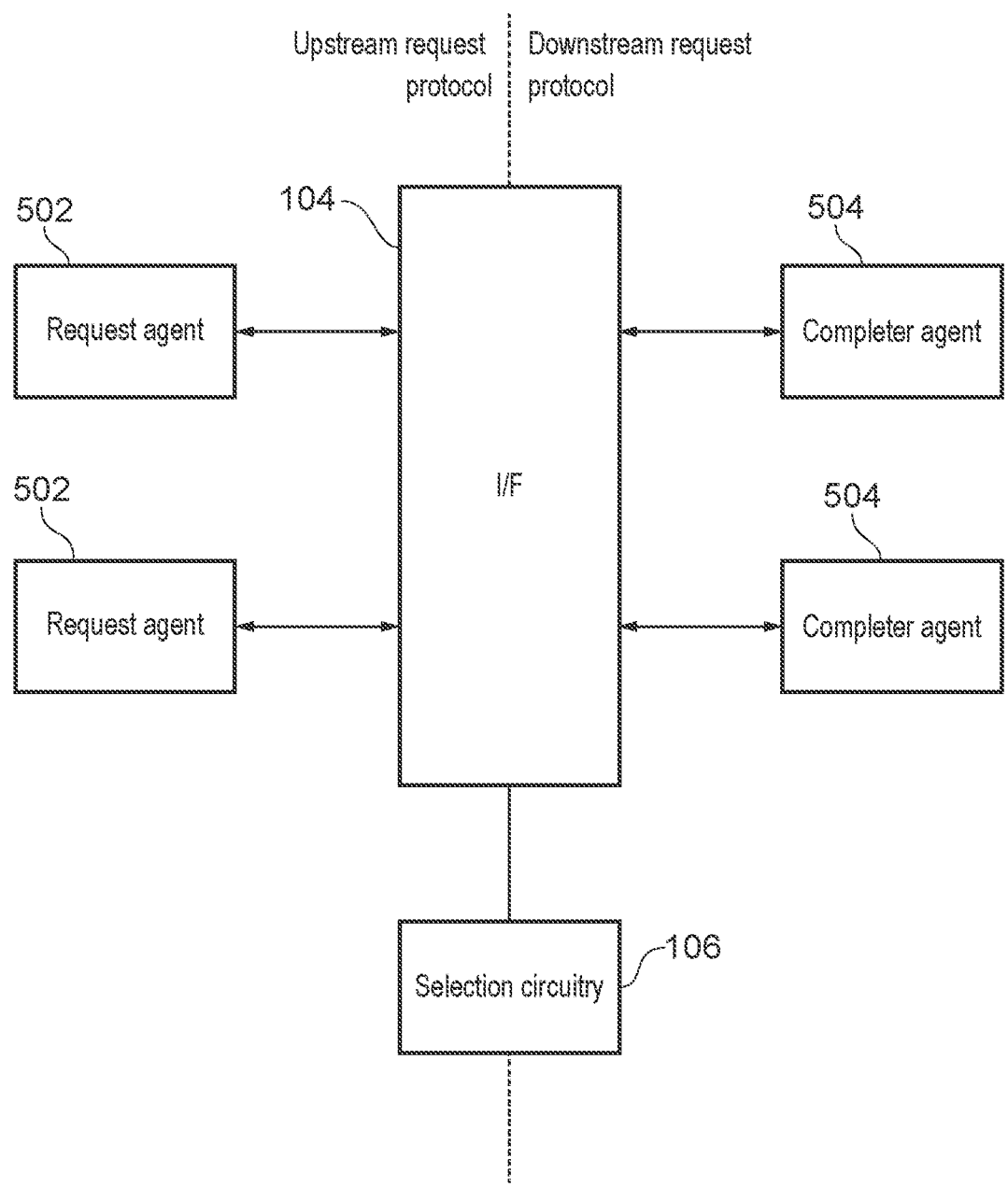
FIG. 5 schematically illustrates a system comprising a plurality of agents coupled to an interface.

FIG. 5 shows an example of a system in which the present technique may be implemented. In FIG. 5, and interface (interface circuitry) 104 is coupled to four agents, including two request agents 502 and two completer agents 504, to which the interface 104 sends outgoing requests according to a downstream request protocol. The request agents 502 send requests to the interface according to an upstream request protocol. The request protocol according to which a given request is sent may define features such as the format of the request (e.g. the size of the request, and what each of the bits in the request are expected to represent) and the destination of the request.

The interface 104 also has access to selection circuitry 106, which is responsive to the interface 104 receiving a given request from one of the request agents 502 to select, from a pool of available identifiers, a selected identifier to be associated with the given request. The interface 104 then sends an outgoing request, corresponding to the given request, to one of the completer agents 504, according to a downstream request protocol, which may be different to the upstream request protocol.

The interface 104 sends the outgoing request together with the selected identifier, and the completer agent 504 acts on the request, before sending a downstream response to the interface 104 with the selected identifier. The selected identifier, therefore, allows the interface to associate a downstream response received from one of the completer agents 504 with an outgoing request sent by the interface 104. For example, this may allow the interface 104 to identify which request agent 502 sent the initial request corresponding with the downstream response.

Once it receives the downstream response and the selected identifier from the completer agent 504, the interface 104 sends an upstream response to the request agent 504 which sent the initial request.

The interface 104 is configured to receive at least two different types of requests from the request agents 504. For example, these could be address translation requests and access requests, but these are just two examples, and other types of request may also be received by the interface 104. For each type of request received by the interface 104, the downstream request protocol used to sent the outgoing request to one of the completer agents 504 may be different. For example, the interface 104 may send an outgoing request according to a first downstream request protocol in response to receiving a given request of a first type, and according to a second downstream request protocol (which is different to the first downstream request protocol) in response to receiving a given request of a second type.

Different downstream request protocols may have varying requirements for any identifier associated with the outgoing request. For example, the first downstream request protocol may limit the size of outgoing requests, such that only a limited number of bits are available for use as an identifier, whereas the second downstream request protocol may have a larger limit, allowing for identifiers comprising a greater number of bits. To accommodate this, the selection circuitry 106 is arranged in a similar way to the selection circuitry 106 shown in FIG. 1, where the pool of items are a pool of identifiers available for selection by the selection circuitry 106, and the subset of the pool of items are all of the identifiers below a certain value (e.g. all of the identifiers with fewer than a given number of bits). This allows the selection circuitry 106 to select an identifier for a given request received by the interface 104 in dependence on the type of the request.

Figure 6:
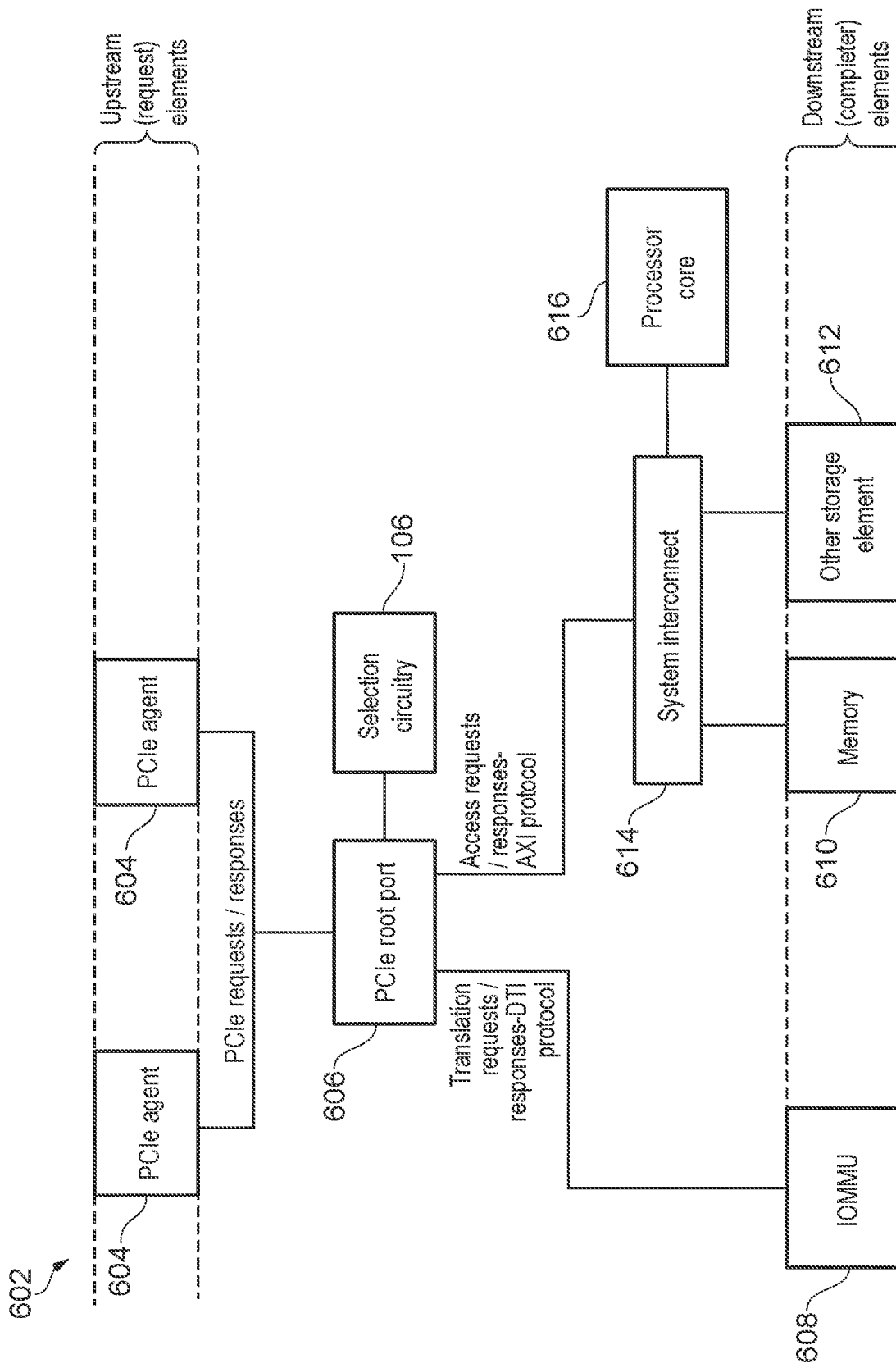
FIG. 6 schematically illustrates an example of a Peripheral Component Interconnect Express (PCIe) network.

FIG. 6 shows a particular example of a system in which the present technique can be applied. In particular, FIG. 6 shows a Peripheral Component Interconnect Express (PCIe) network 602. PCIe is a communication standard for hardware interfaces, and describes an upstream request protocol to be applied to requests and responses sent between the interface and one or more upstream elements coupled to the interface. For example, an interface between a system-on-chip (SoC) and various external/peripheral devices may comply with the PCIe protocol.

In the example of FIG. 6, the interface comprises a PCIe root port 606 and the upstream agents comprise PCIe agents 604. The PCIe agents 604 are examples of the request agents 502 shown in FIG. 5, and are configured to send PCIe requests to the PCIe root port 606 according to a PCIe request protocol. The PCIe agents 604 could include hardware accelerators, and Input/Output (I/O) devices for communicating between a data processing system and the outside world, each the I/O devices may communicate with user input devices, network controllers, USB interfaces, etc. The PCIe root port 606 is an example of the interface 104 shown in FIGS. 1 and 5, and is configured to send responses to the PCIe agents 604 according to a corresponding PCIe response protocol. The PCIe requests transmitted by the PCIe agents 604 can be any of a number of different types of request, but two particular examples are address translation requests (e.g. requests specifying a given virtual or intermediate physical address to be translated into a corresponding intermediate physical or physical address) and access requests (e.g. requests to read or write data to a target location in memory 610 or another storage element 612).

Downstream of the PCIe root port 606, a number of downstream agents are provided. For example an IOMMU (input/output memory management unit) 608, which may be responsible for handling address translation requests issued by the PCIe agents 604, is coupled to the PCIe root port 606. The PCIe root port 606 may be responsive to receiving a given translation request to transmit an outgoing request—along with an identifier—to the IOMMU 608, requesting the IOMMU 608 to provide, to the PCIe root port 606, a physical address (or, in some examples, an intermediate physical address) corresponding to a virtual address (or, in some examples, an intermediate physical address) specified in the outgoing request. The PCIe root port 606 then provides the translated address to the requesting agent.

Other downstream elements which may be coupled to the PCIe root port 606 include memory 610 and one or more further storage elements 612. The memory 610 and other storage elements 612 may be coupled to the PCIe root port 606 via a system interconnect 614, to which a processor core 616 may also be coupled, and the system interconnect 614, processor core 616, memory 610 and other storage elements 612 may—in some examples—all be provided as part of a SoC (which may also include the PCIe root port 606, selection circuitry 106 and IOMMU 608). The PCIe root port 606 may pass on any access requests (e.g. read requests to read data at a target location in memory 610 or another storage element 612, or write requests to store data to a target location) to the memory 610 or other storage elements 612. In particular, the PCIe root port 606 may be responsive to receiving an access request to transmit an outgoing request—along with an identifier—to the memory 610 or other storage elements 612 via the system interconnect 614.

The PCIe root port 606 sends each outgoing request with an identifier, allowing any responses received from the downstream components to be associated with their corresponding requests.

In a PCIe network, different outgoing requests (e.g. requests sent from the PCIe root port 606 to downstream components) may be transmitted according to different request protocols (also referred to as downstream request protocols). For example, the PCIe root port 606 may map incoming address translation requests to outgoing requests with a format defined by a Distributed Translation Interface (DTI) protocol, and may map incoming access requests to an Advanced eXtensible Interface (AXI) protocol. AXI and DTI are protocols provided by Arm® Limited of Cambridge, UK, but it will be appreciated that other examples may use a different protocol.

In the DTI protocol, requests and responses may be limited to a certain maximum width (e.g. a maximum number of bits in each request/response), which may mean that there is only a limited number of bits available in each request/response for an identifier. This, in turn, may mean that there is a maximum possible value for identifiers associated with DTI requests/responses. On the other hand, requests and responses sent according to the AXI protocol may not be limited in the same way, and thus there may be no architecturally-defined maximum size for identifiers associated with AXI requests/responses (or the maximum size may be greater than the maximum size possible for identifiers associated with DTI requests/responses). Therefore, in accordance with the present technique, selection circuitry 106 is provided, which selects an identifier to be associated with a given request in dependence on the type of the request. In particular, the selection circuitry 106 may have a similar arrangement to the selection circuitry shown in FIG. 1, and thus can allow the selected identifier to be tailored to the type of request, without significantly increasing the circuit area taken up by the selection circuitry 106.

It will be appreciated that a PCIe network and the specific protocols mentioned above (the PCIe, DTI and AXI protocols) are purely illustrative. The present technique can be applied to any number of systems: for example, the present invention may be implemented in any system comprising an interface which receives requests of at least two different types, and which is configured to associate a selected item with each request. Moreover, even within a PCIe network as illustrated in FIG. 6, any number of different downstream request protocols could be used instead of (or in addition to) the DTI and AXI request protocols described.

Figure 7A:
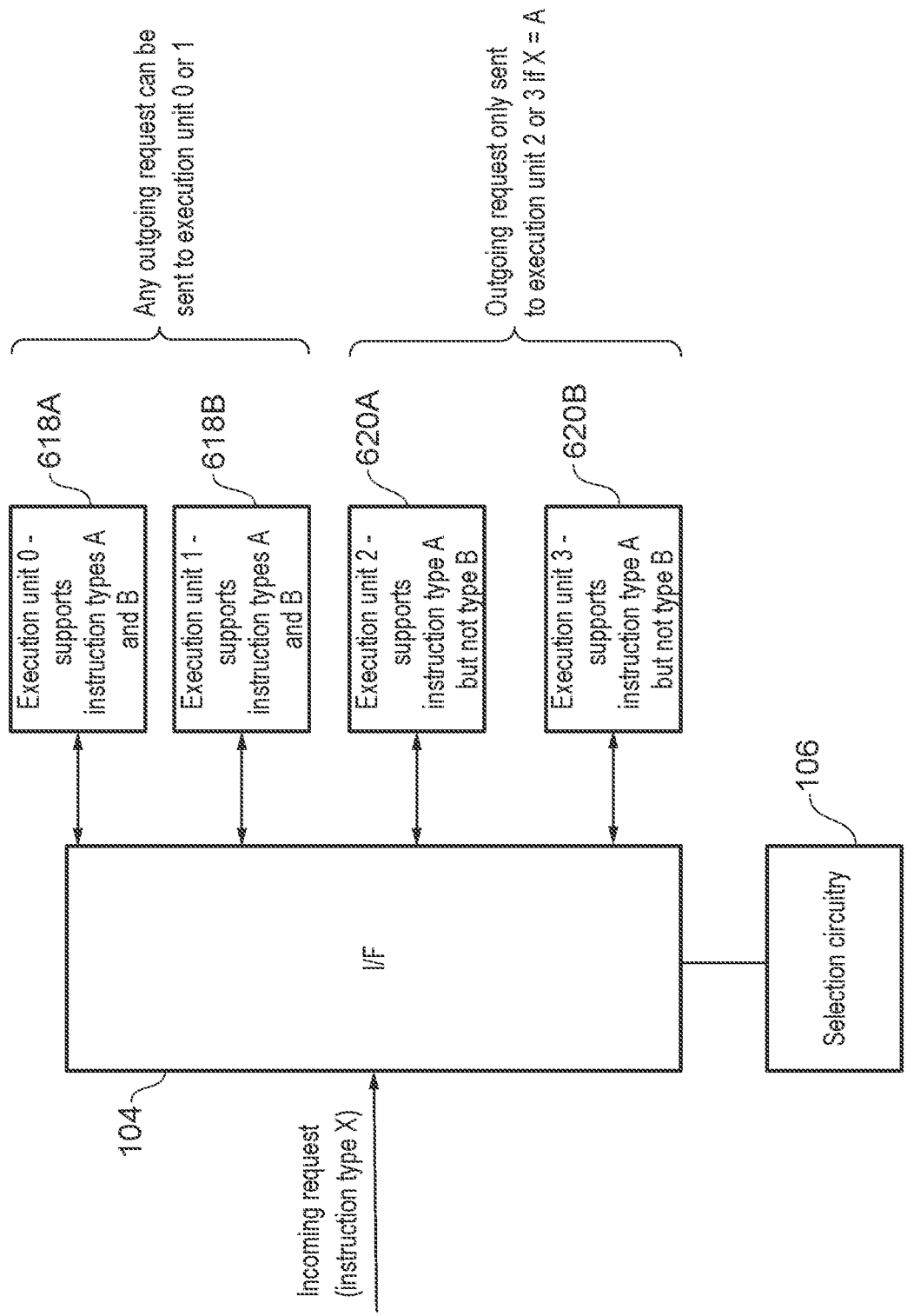
FIGS. 7A and 7B show examples of different hardware resources selectable for a given request.
Figure 7B:
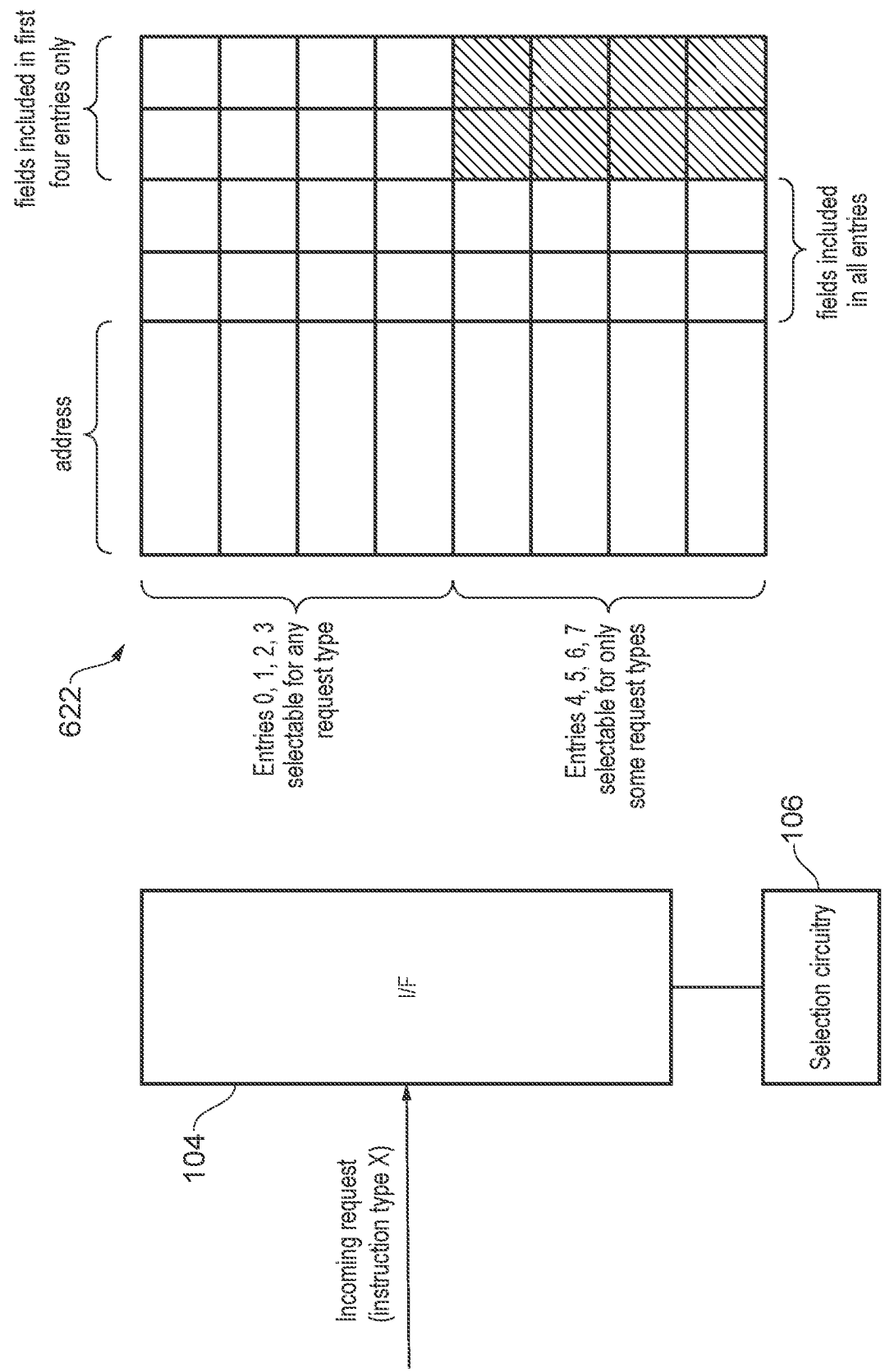

While FIG. 6 shows an example in which the pool of items comprises a pool of identifiers, this is just one example implementation of the present technique. FIGS. 7A and 7B show further examples of systems in which different hardware resources may be selectable for different kinds of request.

In particular, FIG. 7A shows a system in which the requests are instructions and the downstream completer elements to which the interface 104 sends outgoing requests comprise execution units. In particular, four execution units are shown: two execution units 618A, 618B support execution of two different types of instruction (A and B), while the other two execution units 620A, 620B support instruction type A but not instruction type B. For example, the first two execution units 618A, 618B may include additional hardware elements which are not included in the other two execution units 620A, 620B. It will be appreciated that, while four execution units are shown in FIG. 7A, there may in fact be any number of execution units. Further, there may be more than two instruction types supported by execution units in the system.

As shown in FIG. 7A, an incoming request received by the interface 104 may request execution of a given type (type X) of instruction, where type X is one of type A and type B. In response to the interface 104 receiving the request, the selection circuitry 106 is configured to select one of the execution units 618, 620 as a destination (completer agent) for the request. The interface 104 then sends an outgoing request to the selected execution unit. The execution units are, therefore, examples of hardware resources selectable for the given request; in the system of FIG. 7A, the pool of items therefore comprises a pool of execution units, and the selected item for the given request comprises an execution unit selected to be the completer agent for the given request.

In the example of FIG. 7A, since execution units 2 and 3 620 do not support execution of instruction type B, the selection circuitry 106 may be arranged to suppress selection of these selection units when the incoming request is for execution of an instruction of type B. For example, the subset of the pool of items may correspond to execution units 2 and 3.

FIG. 7B, meanwhile, shows an example wherein the selection circuitry 106 is configured to select, for a given input request, an entry in a cache or buffer 622 (the entry being an example of a hardware resource selectable for a request). The cache or buffer 622 shown in FIG. 7B comprises 8 entries, each comprising an address field and at least two further fields. In addition, cache entries 0, 1, 2 and 3 also comprise two additional fields which are not available in entries 4, 5, 6 and 7. Therefore, while the first four entries may be able to support requests of any type, the last four entries may only be able to support some types of request; for example, at least one type of request may be associated with additional data to be stored in one or both of the two additional fields provided for the first four entries, or may require the functionality represented by the additional fields. Accordingly, since the final four entries do not include these fields, the selection circuitry 106 may be configured to suppress selection of one of the final four entries when a given request is of that at least one type. Therefore, in the example of FIG. 7B, the pool of items comprises the entries in the cache or buffer 622, and the subset of the pool of items comprises entries 4, 5, 6 and 7 of the cache or buffer 622.

Figure 8:
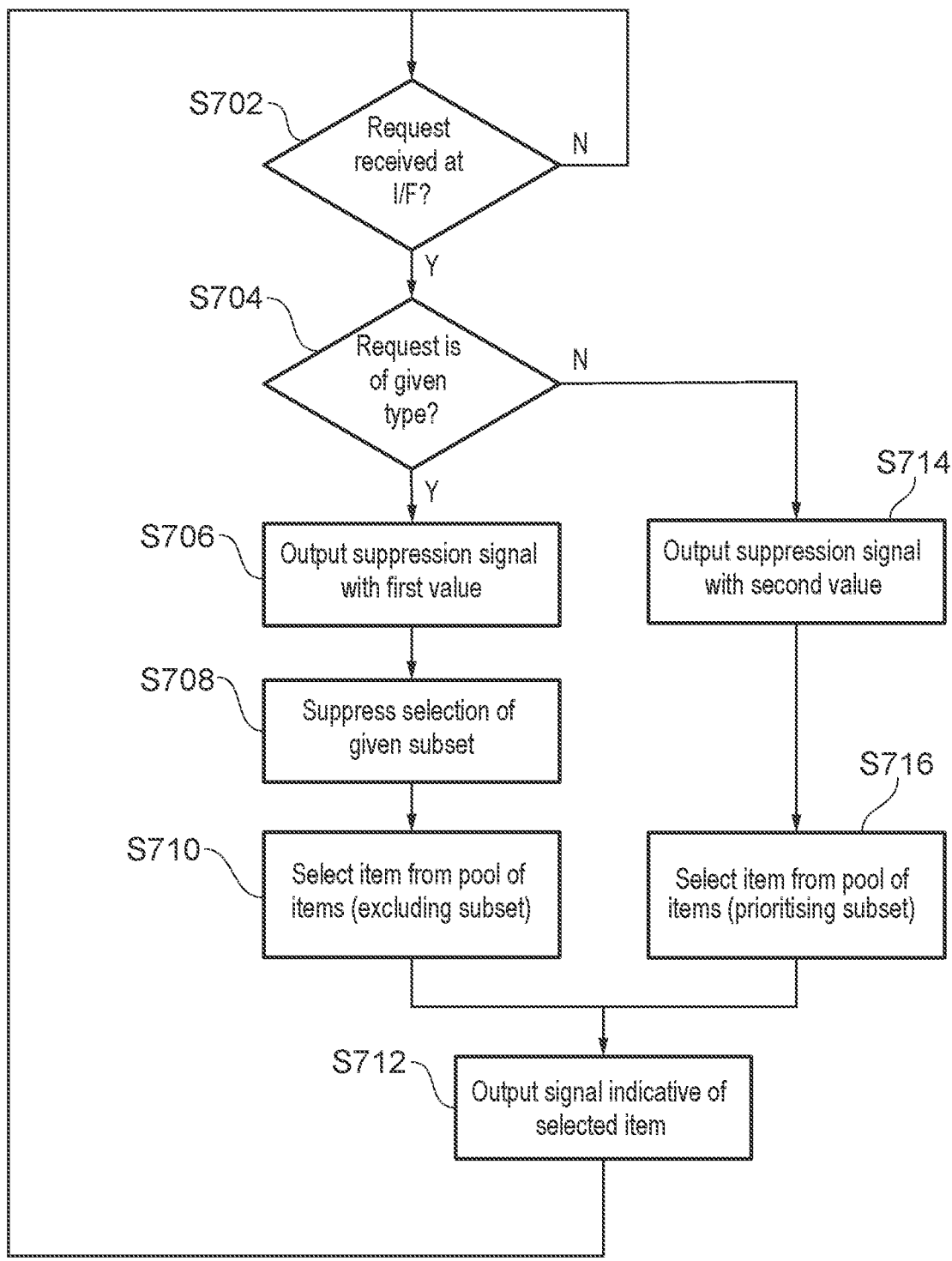
FIG. 8 is a flow diagram showing an example method of selecting an item from a pool of items to be associated with a request.

FIG. 8 is a flow diagram showing an example of a method carried out according to the present technique. In particular, the method includes a step S702 of determining whether a request has been received at an interface. Then, once a request has been received, it is determined S704 whether the request is of a given at least one type. If the request is of the at least one type, control circuitry outputs S706 a suppressions signal with a first value, and selection circuitry is responsive to the suppression signal having the first value to suppress S708 selection of an item from a given subset of a pool of items. Accordingly, the selection circuitry selects S710 an item from the pool of available items that is not within the given subset, and outputs S712 a signal indicative of the selected item.

On the other hand if, at step S704, it is determined that the request is not of the given type, the control circuitry outputs S714 a suppression signal with a second value. When the suppression signal has the second value, the selection circuitry does not suppress selection of items from the given subset, and instead can select S716 any item from the pool of items, but may prioritise selection of an item within the subset.

Figure 9:
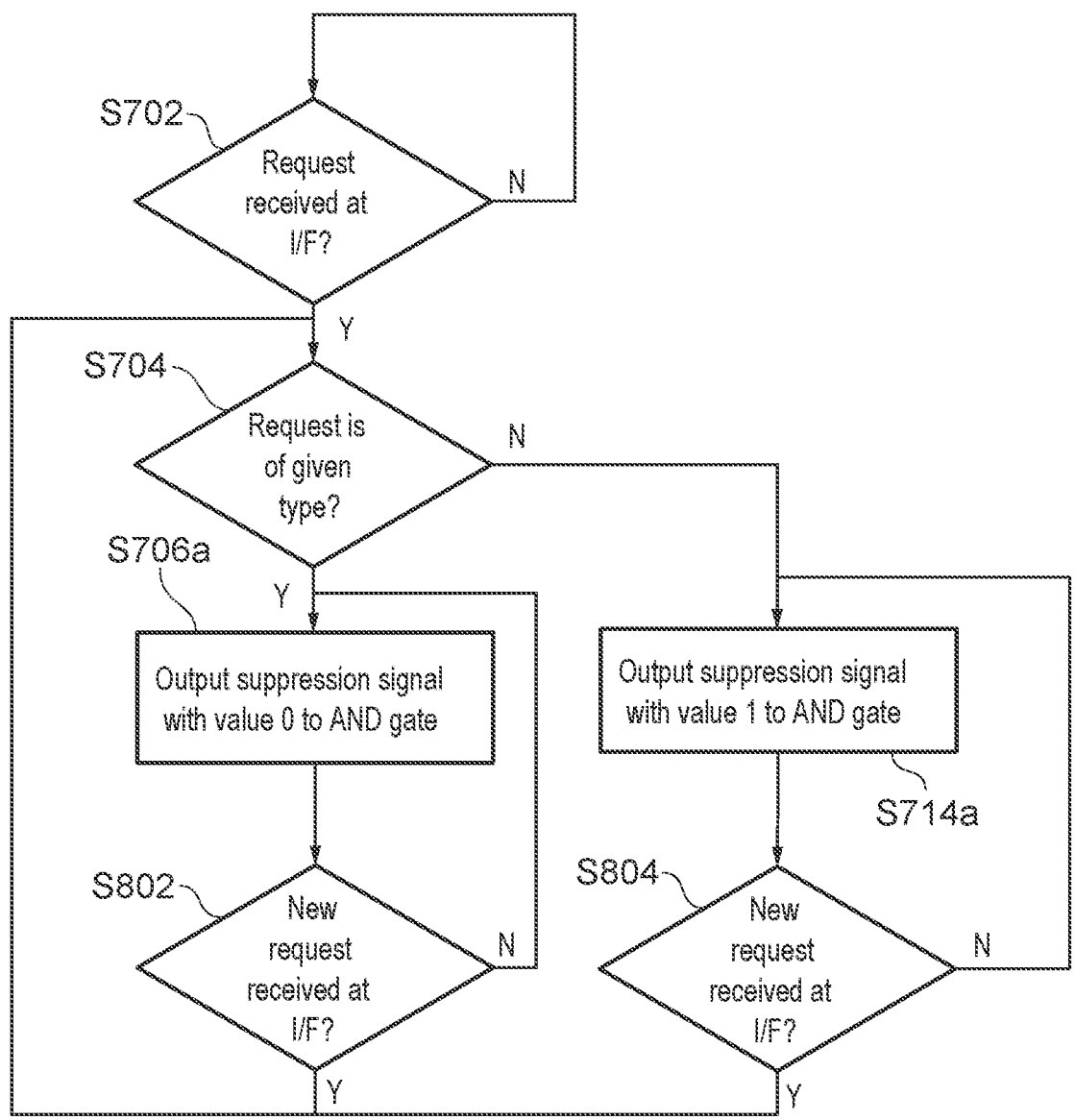
FIG. 9 is a flow diagram showing an example method of operation of control circuitry.

FIG. 9 is a flow diagram showing an example of the operation of the control circuitry of the present technique. The method of FIG. 8 includes steps S702, S704 and S706 as in FIG. 8. Steps S706a and S714a are specific examples of steps S706 and S714, in which the first and second values of the suppression signal are specified as 0 and 1 respectively, and in which it is specified that the suppression signal is output to an AND gate. Thus, the method shown in FIG. 8 can be used with a gate node such as that shown in FIG. 2B, for example.

The method of FIG. 9 also includes steps S802 and S804 of determining whether a new request has been received at the interface. If a new request has been received, the method returns to step S704; if a new request has not been received, the control circuitry continues to output the suppression signal with the same value (e.g. a value of 0 if the outcome of step S802 is no, and a value of 1 if the outcome of step S804 is no).

Figure 10:
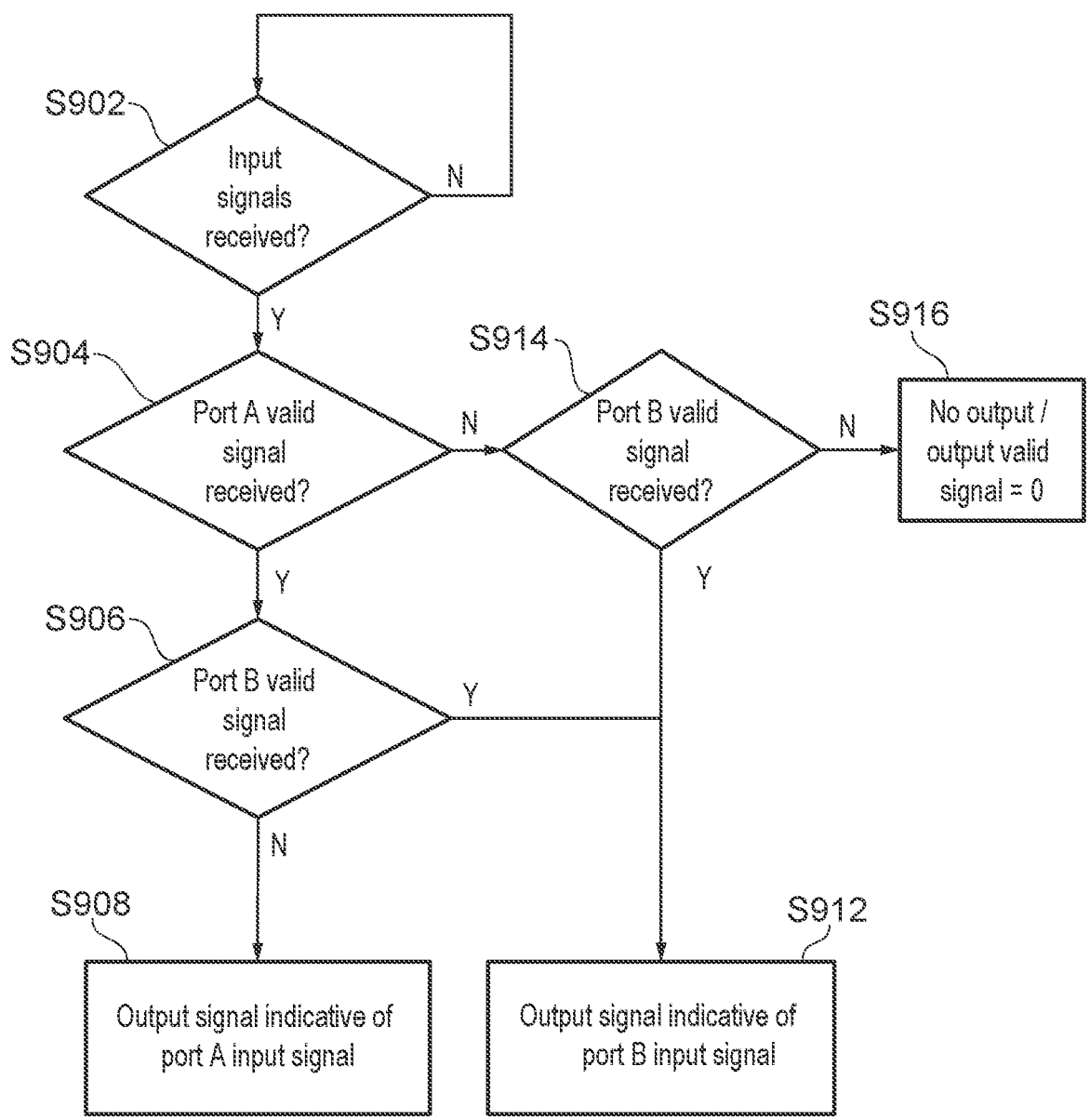
FIG. 10 is a flow diagram showing an example method of operation of a gate node.

FIG. 10 is a flow diagram showing an example of operation of a 2:1 (e.g. n=2, m=1) gate node (e.g. the gate node 110 shown in FIG. 2B). The method includes a step S902 of determining whether input signals have been received at the gate node (e.g. at port A and port B of the gate node). When input signals have been received, it is determined S904 whether the signal at port A (indicative of items outside of the subset of the pool of items) is valid. If the signal at port A is valid, it is determined S906 whether the signal at port B (indicative of items in the subset) is valid. If it is determined that the signal at port A is valid but the signal at port B is not valid, the gate node outputs S908 a signal indicative of the input signal at port A. For example, the input signal received at port B may be indicated as invalid because the associated item in the pool of items is not available (e.g. it has been allocated to another request which is still pending). Alternatively, the input signal at port B may be indicated as invalid even if the corresponding item is available, for example if the suppression signal is set to indicate that the subset of the pool of items should be excluded. On the other hand, if it is determined that both the signal at port A and the signal at port B are valid, the gate node outputs a signal indicative of the input signal at port A.

Returning to step S904, if it is determined that the signal at port A is invalid, it is still determined S914 whether the signal received at port B is valid. If the signal at port A is invalid and the signal at port B is valid, the gate node outputs S912 a signal indicative of the signal at port B. If none of the signals received at the gate node is valid, the gate node outputs S916 either a valid signal of 0 (indicating that the output of the gate node does not correspond to an available item) and/or does not output any signal (other than a valid signal of 0).

As discussed in detail above, the selection of the signal at port B whenever it is indicated as valid (e.g. when the corresponding item is available and the suppression signal has a value of 1) is just one example of how the selection of port B may be prioritised at the gate node. Other methods of prioritising port B—which may be layered on top of other selection criteria—may be used instead. Moreover, it will be appreciated that it is not essential for the gate node to prioritise selection of port B; any other selection criteria could be applied instead, provided that selection of port B is suppressed when the suppression signal indicates that the subset of items should be excluded from selection.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

I claim:

1. An apparatus comprising:
   interface circuitry to receive requests; and
   selection circuitry responsive to the interface circuitry receiving a given request to select, from a pool of items, at least one selected item to be associated with the given request;
   wherein the selection circuitry comprises a plurality of nodes, each configured to select m output signals from n input signals provided to that node, wherein n>m;
   wherein the plurality of nodes are arranged in a tree structure comprising a plurality of layers including at least a first layer of nodes and a final layer comprising a final node, the first layer of nodes being configured to receive input signals indicative of items in the pool of items, and the final node being configured to output a signal indicative of the at least one selected item, the output signals from a given layer of nodes other than the final node being supplied as the input signals for a subsequent layer; and
   wherein the apparatus comprises control circuitry configured to output, in dependence on a type of the given request, a suppression signal, and the tree structure comprises a gate node configured to suppress, in response to the suppression signal having a first value, selection from input signals received from a given portion of the tree structure to prevent a subset of the pool of items from being selected for at least one type of request,
   wherein:
   each node in the tree structure has the same values of n and m, wherein m=1;
   the pool of items comprises p items and the subset of the pool of items comprises s items;
   the gate node is positioned in a given layer which is y layers before the final layer, where when y=0 the given layer is the final layer itself and when y>0 the given layer is an earlier layer than the final layer;
   the gate node is responsive to the suppression signal having the first value to prevent x of its input signals from being selected, wherein x<n; and
   the position of the given layer is defined by $x/n^{(y+1)}=s/p$.

2. The apparatus of claim 1, wherein
   the gate node is responsive to the suppression signal having a second value to prioritize selection from input signals indicative of items in the subset of the pool of items over selection from input signals indicative of items outside of the subset of the pool of items.

3. The apparatus of claim 1, wherein
   the final node comprises the gate node.

4. The apparatus of claim 1, wherein
   the gate node is positioned in a layer other than the final layer.

5. The apparatus of claim 1, wherein
   the selection circuitry is configured to use the same tree structure for the at least one type of request and at least one other type of request.

6. The apparatus of claim 1, wherein
   each node is configured to select the m output signals in dependence on an availability signal associated with each of the n input signals, each availability signal indicating whether an associated item in the pool of items is available for selection.

7. The apparatus of claim 6, wherein:
   the gate node comprises an AND gate to receive the availability signal associated with one of the n input signals supplied to the gate node; and
   the AND gate is configured to combine the availability signal and the suppression signal to generate a selection signal to control whether said one of the n input signals is available for selection by the gate node.

8. The apparatus of claim 1, wherein each node is configured to select them output signals in dependence on at least one of:
   a least-recently-used (LRU) policy wherein the m output signals for each node are selected in dependence on which of the items represented by the n input signals were least recently assigned to a request;
   a priority policy wherein the m output signals for each node are selected in dependence on a priority associated with at least one of the n input signals; and
   a most-recently-used (MRU) policy wherein the m output signals for each node are selected in dependence on which of the items represented by the n input signals were most recently assigned to a request.

9. The apparatus of claim 1, wherein:
   each item in the pool of items comprises a hardware resource selectable for allocating to a request;
   for the at least one type of request, the selection circuitry is restricted to selection of a hardware resource outside said subset of the pool of items, and for another type of request, the selection circuitry is capable of selecting any of the hardware resources in the pool of items.

10. An apparatus comprising:
    interface circuitry to receive requests; and
    selection circuitry responsive to the interface circuitry receiving a given request to select, from a pool of items, at least one selected item to be associated with the given request;
    wherein the selection circuitry comprises a plurality of nodes, each configured to select m output signals from n input signals provided to that node, wherein n>m;
    wherein the plurality of nodes are arranged in a tree structure comprising a plurality of layers including at least a first layer of nodes and a final layer comprising a final node, the first layer of nodes being configured to receive input signals indicative of items in the pool of items, and the final node being configured to output a signal indicative of the at least one selected item, the output signals from a given layer of nodes other than the final node being supplied as the input signals for a subsequent layer; and
    wherein the apparatus comprises control circuitry configured to output, in dependence on a type of the given request, a suppression signal, and the tree structure comprises a gate node configured to suppress, in response to the suppression signal having a first value, selection from input signals received from a given portion of the tree structure to prevent a subset of the pool of items from being selected for at least one type of request,
    wherein:
    each item in the pool of items comprises an identifier;
    the selected item comprises a selected identifier to be associated with the given request;
    the interface is configured to receive the requests from at least one agent, and to transmit responses to the at least one agent in response to the requests; and
    the interface is responsive to receiving the given request to send an outgoing request and the selected identifier to a completer agent coupled to the interconnect, and to receive a given response and the selected identifier from the completer agent.

11. The apparatus of claim 10, wherein:

the subset of the pool of items comprises identifiers with a value greater than or equal to a threshold identifier value specifiable for requests of said at least one type.

12. The apparatus of claim 10, wherein:

the interface is configured to send the outgoing request according to an outgoing request protocol, wherein the outgoing request protocol is selected in dependence on whether the given request is of a first type or a second type; and the at least one type of request comprises the first type.

13. The apparatus of claim 10, wherein:

the outgoing request protocol comprises a first request protocol when the given transaction is of the first type and a second request protocol different to the first request protocol when the given transaction is of the second type.

14. The apparatus of claim 12, wherein:

the interface is configured to send the outgoing request according to a first configuration of the outgoing request protocol when the given transaction is of the first type and to send the outgoing request according to a second configuration of the outgoing request protocol when the transaction is of the second type.

15. The apparatus of claim 12, wherein:

the completer agent is specified by the given request; and the first type of request comprises a request specifying a first completer agent, and the second type of request comprises a request specifying a second completer agent different to the first completer agent.

16. The apparatus of claim 12, wherein:

the interface is configured to receive address translation requests and access requests to access data stored in a storage device coupled to the interface; and the first type of request comprises the address translation requests and the second type of request comprises the access requests.

17. A method comprising:

receiving requests; and in response to receiving a given request, selecting, from a pool of items, at least one selected item to be associated with the given request;

wherein the selected item is selected using selection circuitry comprising a plurality of nodes, each configured to select m output signals from n input signals provided to that node, wherein n>m;

wherein the plurality of nodes are arranged in a tree structure comprising a plurality of layers including at least a first layer of nodes and a final layer comprising a final node, the first layer of nodes being configured to receive input signals indicative of items in the pool of items, and the final node being configured to output a signal indicative of the at least one selected item, the output signals from a given layer of nodes other than the final node being supplied as the input signals for a subsequent layer; and wherein the method comprises outputting, in dependence on a type of the given request, a suppression signal, and suppressing, at a gate node and in response to the suppression signal having a first value, selection from input signals received from a given portion of the tree structure to prevent a subset of the pool of items from being selected for at least one type of request, wherein:

each node in the tree structure has the same values of n and m, wherein m=1;

the pool of items comprises p items and the subset of the pool of items comprises s items;

the gate node is positioned in a given layer which is y layers before the final layer, where when y=0 the given layer is the final layer itself and when y>0 the given layer is an earlier layer than the final layer;

the method comprises preventing, at the gate node and in response to the suppression signal having the first value, x of the gate node's input signals from being selected, wherein x<n; and the position of the given layer is defined by $x/n^{(y+1)}=s/p$.

* * * * *